US009236902B2

(12) United States Patent
Papasakellariou

(10) Patent No.: US 9,236,902 B2
(45) Date of Patent: Jan. 12, 2016

(54) COMBINED EQUALIZER AND SPREAD SPECTRUM INTERFERENCE CANCELLER METHOD AND IMPLEMENTATION FOR THE DOWNLINK OF CDMA SYSTEMS

(75) Inventor: Aris Papasakellariou, Dallas, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 1732 days.

(21) Appl. No.: 10/219,966

(22) Filed: Aug. 15, 2002

(65) Prior Publication Data
US 2004/0032848 A1 Feb. 19, 2004

Related U.S. Application Data

(60) Provisional application No. 60/315,472, filed on Aug. 28, 2001.

(51) Int. Cl.
*H04B 1/7107* (2011.01)
*H04B 1/7115* (2011.01)

(52) U.S. Cl.
CPC .......... *H04B 1/7107* (2013.01); *H04B 1/71075* (2013.01); *H04B 1/7115* (2013.01)

(58) Field of Classification Search
USPC ........................... 370/335, 342; 375/147, 148
See application file for complete search history.

(56) References Cited

U.S. PATENT DOCUMENTS 6,175,588 B1 * 1/2001 Visotsky et al. ............. 375/148
6,192,067 B1 * 2/2001 Toda et al. .................... 375/144
6,496,534 B1 * 12/2002 Shimizu et al. ............. 375/148
6,515,980 B1 * 2/2003 Bottomley ................... 370/342
6,570,863 B1 * 5/2003 Kim et al. .................... 370/342

(Continued)

FOREIGN PATENT DOCUMENTS

DE 198 26 036 A1 12/1999
WO WO 01/29983 A1 4/2001

OTHER PUBLICATIONS

"Analysis of Combined MMSE/PIC Multi-User Detection for CDMA Spread Spectrum Systems", Host-Madsen, A., and Cho, Kyung-Seon, Communications, 1998. ICC 98. Conference Record. 1998 IEEE International Conference on Atlanta, GA, USA Jun. 7-11, 1998, New York, NY, USA, IEEE, US, Aug. 7, 1998, pp. 699-703, XP010284713, ISBN: 0-7803-4788-9.

(Continued)

*Primary Examiner* — Marcus R Smith
(74) *Attorney, Agent, or Firm* — Ronald O. Neerings; Frank D. Cimino

(57) ABSTRACT

The present invention describes a method and apparatus for implementing a mobile receiver (10) that combats multiple access interference (MAI) in a code division multiple access (CDMA) spread spectrum system. Such capability is required by mobile receivers to support high data rate applications such as the ones provided by HSDPA and 1xTREME. A receiver (10) combining equalization and interference cancellation (IC), according to the invention, avoids the shortcomings of either equalization or IC and provides superior performance relative to prior art methodologies. The approach proposed by this invention for the operation of the mobile receiver is to first perform equalization (12) of the received signal (r) and then use the resulting decisions to perform IC. Combining equalization and IC yields a complexity that is smaller to that obtained by implementing conventional IC with a Rake receiver for the same performance.

19 Claims, 3 Drawing Sheets

(56) References Cited

U.S. PATENT DOCUMENTS

| | | | |
|---|---|---|---|
| 6,614,766 B1 * | 9/2003 | Seki et al. | 370/286 |
| 6,647,077 B1 * | 11/2003 | Shan et al. | 375/346 |
| 6,725,025 B1 * | 4/2004 | Schmidl et al. | 455/278.1 |
| 6,810,073 B1 * | 10/2004 | Karlsson | 375/144 |
| 6,956,893 B2 * | 10/2005 | Frank et al. | 375/147 |
| 6,963,546 B2 * | 11/2005 | Misra et al. | 370/294 |
| 2002/0181549 A1 * | 12/2002 | Linnartz et al. | 375/142 |
| 2003/0076908 A1 * | 4/2003 | Huang et al. | 375/350 |
| 2003/0133424 A1 * | 7/2003 | Liang et al. | 370/335 |

OTHER PUBLICATIONS

"Combined Successive Cancellation and Joint Demodulation for the Suppression of Adjacent Channel Interference", Arslan, H., et al., Wireless Communications and Networking Conference, 1999. WCNC. 1999 IEEE New Orleans, LA, USA Sep. 21-24, 1999, Piscataway, NJ, USA, IEEE, US, Sep. 21, 1999, pp. 1114-1118, XP010353728, ISBN: 0-7803-5668-3.

"Multiple Access Interference Suppression With Linear Chip Equalizers in WCDMA Downlink Receivers", Hooll, Karl, et al., Globecom 99, General Confereence (Part A), XP010373345, pp. 467-471.

* cited by examiner

COMBINED EQUALIZER AND SPREAD SPECTRUM INTERFERENCE CANCELLER METHOD AND IMPLEMENTATION FOR THE DOWNLINK OF CDMA SYSTEMS

This is a nonprovisional application claiming priority from provisional application Ser. No. 60/315,472, filed Aug. 28, 2001.

TECHNICAL FIELD OF THE INVENTION

This invention relates to the forward link (downlink) of CDMA communications systems in multipath propagation environments where each received signal path experiences interference from other signals and other paths of the same signal. It presents a novel method to suppress interference by combining equalization and interference cancellation. It also describes an implementation for the disclosed combined equalization and interference cancellation method.

BACKGROUND OF THE INVENTION

Code division multiple access (CDMA) has been extensively used in such applications as cellular and satellite communications. CDMA signals increase the spectrum required for the transmission of a particular data rate by modulating each information symbol with a spread spectrum code having a rate larger than the data rate. The same spreading code is used for each information symbol. Typically, the spreading code comprises of a few tens or a few hundreds elements, called chips. To decrease the correlations among spreading codes assigned to different users and thereby reduce the interference among different users, the data stream after spreading is typically scrambled with a pseudonoise (PN) code that is generated serially and cyclically and has a larger period than the spreading code. Examples of such CDMA signal spreading are the schemes used by the IS-95/CDMA2000 and 3GPP systems.

With CDMA, the signals from all users simultaneously occupy the same frequency band. The receiver discriminates the multiple signals by exploiting the properties of the spreading and scrambling codes that are applied to the signal of each user. The receiver attempts to match in time with the codes of the desired signal a replica of those spreading and scrambling codes. Only then the demodulation result is meaningful; otherwise it appears noise-like. Thus, if the arriving signals have different codes or different code off-sets, they can be discriminated at the receiver.

In the forward link of cellular communication systems, i.e. the communication from base stations to mobile terminals, the wireless channel may introduce multipath propagation. Even if the signals transmitted by the base station are spread using orthogonal codes (Walsh codes), the multipath propagation will destroy the orthogonality and produce multiple-access interference (MAI).

Interference cancellation (IC) attempts to suppress the MAI by estimating and subtracting the interference from the received signal, as disclosed in U.S. Pat. No. 5,553,062 to Schilling. Because the capacity of CDMA systems is typically MAI limited, estimating and canceling the MAI will increase the capacity. Alternatively, IC can reduce the symbol or frame error rate thereby allowing communication with higher data rates.

Equalization also attempts to suppress the MAI by restoring the orthogonality of the transmitted signals at the receiver. This is accomplished by inverting the effects introduced by the channel due to multipath propagation, as disclosed in "*Multiple Access Interference Suppression with Linear Chip Equalizers in WCDMA Downlink Receivers*", K. Hooli, et. al, pp. 467-471, Globecom 1999.

Conventional IC schemes use knowledge of the spreading and scrambling codes used to transmit the signals, the decisions from a Rake receiver, and a channel estimate to reconstruct the components of the received signal and remove the interference, as disclosed in U.S. Pat. No. 5,553,062 to Schilling. The Rake receiver is however highly suboptimal in the presence of interference, particularly for higher order data modulations such as QAM. The data decisions provided by the Rake have poor reliability and when used by IC to reconstruct the interference they can result in significant performance degradation since the estimated received signal components are not very accurate. Subsequent cancellation of the estimated interference can therefore result in worse performance than the one of the Rake receiver since additional interference may be introduced due to erroneous decisions.

Conventional equalization methods try to either adapt to a known signal, such as the common pilot signal transmitted in the downlink of CDMA systems, or attempt to estimate or adapt to the channel impulse response and then use it to reverse the impact of multipath propagation on the received signal. Examples of well-known equalizers based on adaptation are the NLMS and its variants while equalizers based on channel inversion are the MMSE and its variants, as disclosed in "*Multiple Access Interference Suppression with Linear Chip Equalizers in WCDMA Downlink Receivers*", K. Hooli, et. al, pp. 467-471, Globecom 1999. Although outperforming the Rake receiver in interference environments, equalization methods perform worse than IC when interference from signals transmitted to other mobile users in the same cell is low to moderate and generally have similar performance to IC in high interference environments.

SUMMARY OF THE INVENTION

A method and apparatus for implementing a mobile receiver combating multiple access interference (MAI) in a code division multiple access (CDMA) spread spectrum system. In particular, the method applies to any mobile receiver capable of despreading multiple CDMA codes used to spread signals transmitted by a base station. Such capability is required by mobile receivers to support high data rate applications such as the ones provided by HSDPA and 1×TREME. More particularly, the invention combines interference cancellation (IC) and equalization in order to avoid the previous shortcomings of individual equalization or IC. By replacing the Rake receiver with an equalizer, the proposed receiver avoids having the poor performance of the Rake impacting the IC performance. Moreover, because of the better reliability of the initial decisions provided to IC, the required number of IC stages to achieve certain performance requirements may be drastically reduced, thereby decreasing the total receiver complexity. By using IC after equalization, the proposed receiver enhances the performance of equalizers by also using IC. The complexity of the proposed receiver is similar or smaller to that of a receiver implementing conventional IC using the decisions of a Rake receiver and is only moderately larger than that of a receiver only implementing an equalizer.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

Figure 1:
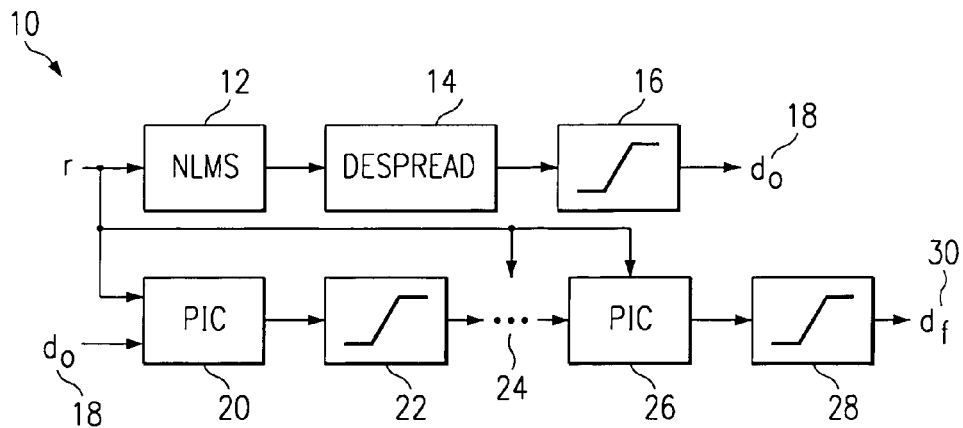
FIG. 1 illustrates an exemplary embodiment of a receiver using equalization and interference cancellation (IC), according a preferred embodiment of the invention.

The present invention is best understood in relation to FIGS. 1-5 of the drawings, like numerals being used for like elements of the various drawings. The preferred embodiments of the invention and corresponding performance benefits relative to the established approach will now be described.

The following description applies to the mobile receiver (or user equipment UE) of a code division multiple access (CDMA) communication system.

A high speed data downlink access (HSPDA) format, such as described in TSG-RAM Working Group 1, "Physical Layer Aspects of UTRA High Speed Downlink Packet Access", ETSI 3GPP 3G TR25.848 V0.6 (2000-05), March 2001 (available on www.3gpp.org) will be considered to describe the invention. However, the invention also applies to the 3GPP Release 1999, 3GPP2, 1×TREME, and to any other CDMA system employing orthogonal spreading in the downlink.

In HSDPA, the UE is assigned a number of orthogonal codes with spreading factor (SF) of 16. The remaining orthogonal codes of SF=16 may form the root or by a branch of the code tree for codes used by other UEs in the same cell and are also orthogonal to the codes used by the HSDPA UE. The existence of multipath propagation destroys the orthogonality in the downlink and the performance of a Rake-based UE receiver is MAI-limited experiencing an error floor. This error floor is particularly severe for amplitude modulations, such as 16-QAM and 64-QAM, that are associated with high data rate transmissions. It is therefore of utmost importance to alleviate the impact of MAI in order to enable the use of spectrally efficient modulations and support high data rate applications.

Conventional interference cancellation (IC) suppresses MAI by despreading each signal, making a decision for the value of the corresponding information symbol with a Rake receiver, using the knowledge of the scrambling and spreading codes and a channel estimate to regenerate the corresponding received signal component, and subtracting it from the received signal. In HSDPA, this approach may consider the multicodes corresponding to the UE as well as known interferers, such as the pilot signal, and IC may by performed according to any of many known techniques. By using decisions based on the Rake receiver the performance of IC may degrade significantly because of the poor reliability of the Rake decisions in multipath propagation environments with MAI. This is particularly true for the initial Rake decisions performed before the first IC stage because they are based on a signal experiencing the whole MAI. Subsequent IC stages reduce the amount of MAI in the received signal and the performance of the Rake receiver is drastically improved. To address the poor reliability of the initial Rake decisions, those decisions are weighted by a small value. This in turn implies that only a small portion of the interference is cancelled during the first IC stage. Subsequently, as the reliability of the decisions is improved, larger weights and larger portion of the interference are used for cancellation in the next IC stages. An implication of this approach is that several IC stages are needed before 100% of the interference is considered for cancellation. Using an equalizer to provide the initial decisions, those decisions are more reliable than the ones from the Rake receiver and as a result large portions of the interference may be cancelled immediately, thereby substantially reducing the total number of IC stages required to achieve certain performance specifications. Thus, by replacing the Rake receiver and several IC stages with an equalizer, the resulting complexity can be reduced, especially if a linear and simple equalizer such the NLMS is used, while achieving similar performance.

Equalization has so far been considered as an alternative approach to IC and the application of equalizers in the CDMA downlink has been extensively studied in the prior art. However, equalization approaches cannot provide better performance than conventional IC in fast fading channels or for low to moderate MAI from other UEs in the same cell and their performance is comparable to that of IC in slow fading high interference environments.

The proposed receiver implementation combines equalization and IC to achieve bit error rate (BER) and frame error rate (FER) suitable for HSDPA or other high data rate systems. An equalizer, such as the NLMS or the linear MMSE, replaces the Rake receiver. Equalization is performed at the chip rate, if the delays of the received paths are known and their separation is larger than 1 chip, or at subchip rate if the requirements for chip-rate operation do not hold. The equalizer length (for chip rate equalization) needs only be about 2 times the delay spread of the strongest paths and paths that are weaker by more than 10 dB relative to the strongest path need not be within the span of the equalizer. The IC process remains the same as with the one using a conventional Rake receiver.

The NLMS is considered as an example for an equalizer and is described below.

Parameters: adaptation constant ($0<\mu<2$); L - NLMS length

Data at time n: $\bar{r}(n)$ - received signal after receiver's filter; $w(n)$ - equalizer tap coefficients; $x(n) = w^H(n)\bar{r}(n)$ - NLMS output; $d(n)$ - desired response, i.e., pilot chip.

Initialisation: $w(0) = 0$

Computation:

output signal: $x(n) = w^H(n)\bar{r}(n)$ error signal: $e(n) = d(n) - x(n)$ weight update:

$$w(n+1) = w(n) + \frac{\mu}{\|\bar{r}(n)\|^2}\bar{r}(n)e^*(n)$$

A comparison for the NLMS complexity relative to that of the Rake is given below in terms of the required operations/sec. $L_e$ denotes the length of the equalizer, and $R_c$ is the chip rate. The adaptation step size $\mu$ is assumed to be power of two, i.e., $\mu = 2^y$. Thus the multiplications with the adaptation step size can be replaced by shifting the numbers. With this assumption, the multiplications with $\mu$ are excluded from Table 1.

TABLE 1

Number of operations per second for CPICH-trained NLMS.

|  | # of additions | # of multiplications |
|---|---|---|
| $x(n) = w^H(n)\bar{r}(n)$ | $(4L_e - 2)R_c$ | $4L_e R_c$ |
| Update w | $(4L_e + 2)R_c$ | $4L_e R_c$ |
| Correlation/code | $4R_c$ | — |
| Total | $8L_e R_c + 4R_c$ | $8L_e R_c$ |

For comparison, the Rake complexity is given in Table 2. The number of fingers is $N_f$ and the symbol rate is $R_s$. Correlation is performed by sign operations and accumulation.

TABLE 2

Number of operations per second for Rake receiver.

|  | # of additions | # of multiplications |
|---|---|---|
| Correlation/code | $4N_f R_c$ | — |
| MRC/code | $2(2N_f - 1)R_s$ | $4N_f R_s$ |
| Total | $4N_f R_c + 2(2N_f - 1)R_s$ | $4N_f R_s$ |

Consider a chip-spaced NLMS equalizer (path arrival time is known and paths are distinct—no need for a fractionally spaced equalizer) and the HSDPA setup ($R_c$=3.84e6, $R_s$=2.4e5). Also assume a multipath delay spread of about 4 chips and 4 fingers (ITU Vehicular A channel with the two weakest paths neglected (they are at −15 dB and −20 dB relative to the first path)). The equalizer length is about 11 chips. An approximate comparison of the complexity between Rake and NLMS is given in Table 3. Both the NLMS and Rake have smaller complexity for Pedestrian channels.

TABLE 3

Number of operations per second for Rake and NLMS.

|  | # of additions | # of multiplications |
|---|---|---|
| Rake (10/5 codes) | 0.72e9/0.43e9 | 0.04e9/0.025e9 |
| NLMS (10/5 codes) | 0.50e9/0.42e9 | 0.34e9/0.34e9 |

Table 3 shows that the NLMS and the Rake have similar complexity in terms of the required additions but the NLMS requires 1 order of magnitude more multiplications. This is because the equalizer coefficients are real numbers and, unlike despreading, actual multiplications are needed. Clearly, from an implementation standpoint, the NLMS is feasible and has comparable complexity to the Rake receiver.

Parallel IC is considered in the exemplary embodiment. A description of PIC can be found in U.S. Pat. No. 5,553,062 to Schilling. A brief mathematical description of PIC is now given. Let $\tilde{c}_l^{(p)}(t)$ be the complex channel estimate and $\tilde{d}_k^{(p)}(t)$ be the estimated data for the $l^{th}$ path ($1 \le l \le L$) of the k-th HSDPA code ($1 \le k \le 10$) at the $p^{th}$ stage (typically, $1 \le p \le 4$). The multipath interference replica $\hat{I}_l^{(p)}(t)$ of the $p^{th}$ stage is expressed as $$\hat{I}_l^{(p)}(t - \hat{\tau}_l) = \sum_{l=1}^{L} \tilde{c}_l^{(p)}(t) \left( \sum_{k=1}^{K} \tilde{d}_k^{(p)}(t - \hat{\tau}_l) \cdot s_k(t - \hat{\tau}_l) + s_{cpich}(t - \hat{\tau}_l) \right)$$

where $s_k(t)$ and $s_{cpich}(t)$ represent the spreading for the $k^{th}$ multicode and the pilot, respectively. Also, $\hat{\tau}_l$ is the estimated delay time of the $l^{th}$ path. By using $\hat{I}_l^{(p)}(t)$ and received signal r(t), the input signal, $r_l^{(p+1)}(t)$ for the $l^{th}$ path at the (p+1)th stage is represented as $$r_l^{(p+1)}(t) = r(t) - \alpha \sum_{\substack{j=1 \\ j \ne l}}^{L} \hat{I}_j^{(p)}(t - \hat{\tau}_j)$$

where $\alpha$ is the real-valued weighting coefficient ($0 \le \alpha \le 1$) and accounts for the bias in the interference estimate. Typically, $\alpha$=0.6-0.8 for p=1 and $\alpha$=1.0 for p>1.

According to the invention, the Rake receiver of the prior art may be replaced by an equalizer at every IC stage. The main benefits however result from having an equalizer to provide the decisions before the first IC stage. This is because the MAI the Rake receiver experiences is largely removed even after one IC stage if the MM is accurately estimated and reconstructed. This is the case if an equalizer replaces the initial Rake receiver. The IC process can also be enhanced to suppress interference caused by signals transmitted to other UEs served by the same base station. In the proposed receiver implementation, the equalizer may or may not replace the Rake receiver after the first IC stage. The equalizer always replaces the Rake receiver before the first IC stage. Moreover, even though a linear equalizer is typically a 2-3 times more complex than the Rake receiver, it is less complex than each IC stage. Thus, if the combination of an equalizer and IC results in a reduction in the number of stages required to achieve the same performance requirements relative to the conventional IC structure (initial decisions to IC provided by a Rake receiver), the overall complexity of the receiver is reduced.

FIG. 1 illustrates a preferred embodiment of a high-speed data downlink access receiver 10. Receiver 10 may be implemented in a base band processor of a receiver of a code division multiple access (CDMA) communication system. Equalizer 12, such as NLMS or other linear equalizer known in the art, is coupled to receive a receive signal r in said base band processor subsequent to analog-to-digital (A/D) conversion. Accordingly, receive signal r is a digital signal. Despreader 14, implementing matched filtering with a specific spreading code, couples equalizer 12 to a decision block 16, which may perform hard, soft, soft-clipped, and/or other decision known in the art. The decision stream 18 from decision block 16 is coupled together with the received signal r to parallel interference canceller (PIC) 20. PIC 20 implements interference cancellation, despreading and the Rake receiver. The output of the Rake receiver inside PIC 20 is fed again to a decision device 22. The new decisions are used for the next IC stages and decision devices 24, if any. The process is finally terminated at the last IC stage 26 and the last decision device 28 provides the final decision used for further processing (e.g. de-interleaving, decoding, etc). Equalizer 12 replaces the Rake of the prior art in providing the initial decisions to a parallel IC method. The IC is then implemented as usual or the equalizer may also replace the Rake receiver in the IC book.

Figure 2:
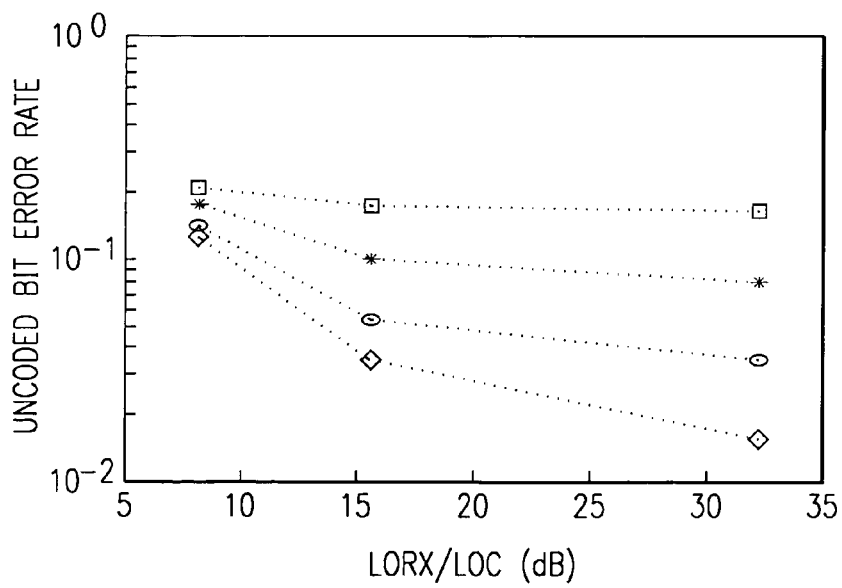
FIG. 2 illustrates a graph of the performance of one implementation of an HSPDA receiver.

FIG. 2 is a graph that illustrates the performance in terms of uncoded bit error rate (BER) for an HSDPA receiver, according to one embodiment of the invention. In the case of FIG. 2, the bit error rate (BER) for 10 SF=16 HSDPA Codes for an ITU Vehicular A Channel.

Figure 3:
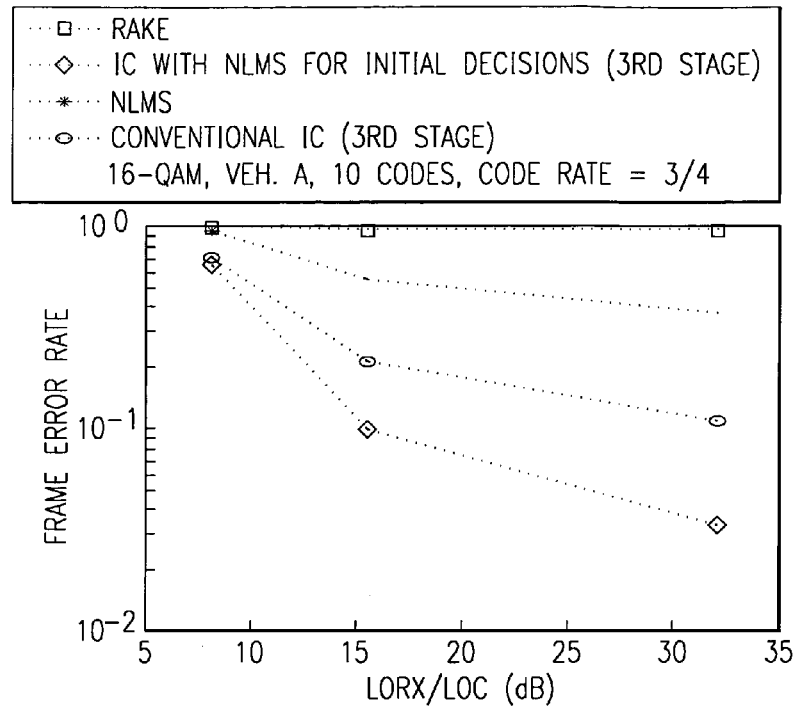
FIG. 3 illustrates a graph of the performance of another implementation of an HSPDA receiver.

FIG. 3 is a graph that illustrates the performance in terms of frame error rate (FER) for an HSDPA receiver, according to another embodiment of the invention. In the case of FIG. 3, the frame error rate (FER) for 10 SF=16 HSDPA Codes for an ITU Vehicular A Channel. Rate ¾ Turbo Code.

Figure 4:
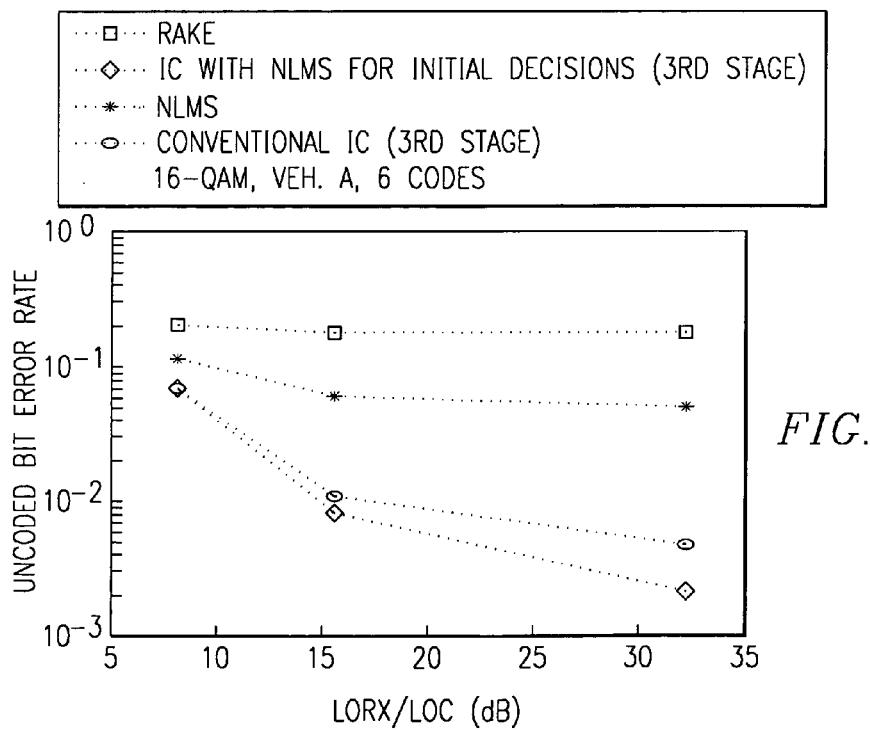
FIG. 4 illustrates a graph of the performance of still another implementation of an HSPDA receiver.

FIG. 4 is a graph that illustrates the performance in terms of uncoded bit error rate (BER) for an HSDPA receiver, according to yet another embodiment of the invention. In the case of FIG. 2, the bit error rate (BER) for 6 SF=16 HSDPA Codes for an ITU Vehicular A Channel.

Figure 5:
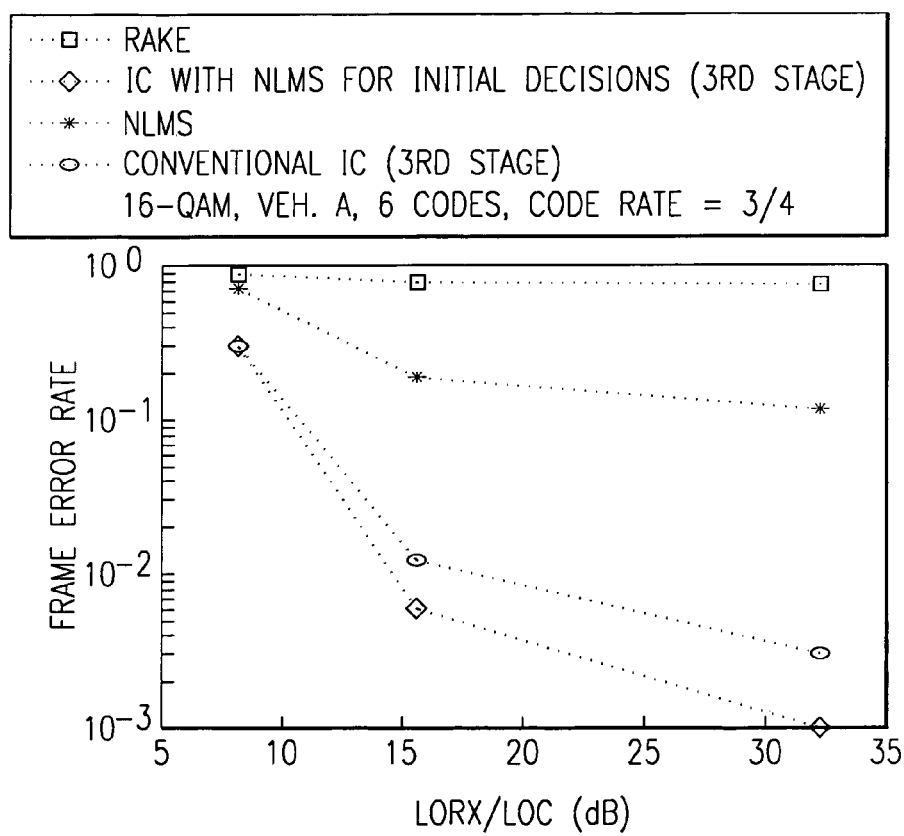
FIG. 5 illustrates a graph of the performance of yet another implementation of an HSPDA receiver.

FIG. 5 is a graph that illustrates the performance in terms of frame error rate (FER) for an HSDPA receiver, according to still another embodiment of the invention. In the case of FIG. 5, the frame error rate (FER) for 10 SF=16 HSDPA Codes for an ITU Vehicular A Channel. Rate ¾ Turbo Code.

FIGS. 2-5 present the performance in terms of uncoded bit error rate (BER) and frame error rate (FER) for several alternative implementations of an HSDPA receiver. These implementations include the Rake receiver, the conventional parallel IC with soft decisions as an exemplary IC method, the NLMS as an exemplary equalization method, and the proposed implementation combining equalization and IC and equalization. Two cases of 10 and 6 HSDPA codes transmitted to the UE are presented. FIGS. 1 and 3 present the BER for the aforementioned cases, while FIGS. 2 and 4 present the FER for a turbo code with rate ¾. Both BER and FER are presented as a function of the ratio (Iorx/Ioc) of the total received power transmitted by the UE's base station at the UE (Iorx) to the power from other cells and thermal noise (Ioc). The ITU Vehicular A model was considered. From the figures it becomes evident that the proposed implementation for the HSDPA receiver considerably outperforms the exemplary IC and equalization methods and can provide FER values below 0.1 for an extensive range of Iorx/Ioc values. This conclusion also holds for a variety of other channel realizations and IC and equalization methods.

In addition to superior performance relative to other receiver implementations, the combination of equalization and IC proposed in this invention also has smaller complexity for the same performance requirements. An equalizer typically requires only a few times more operations that the Rake receiver while each IC stage is more complex than the equalizer. Thus, even if one IC stage is eliminated, the resulting complexity of the disclosed receiver structure is smaller than the conventional one using the Rake receiver to provide the initial decisions to the IC. It is usually possible to eliminate more than one IC stages and still achieve the required performance, thereby obtaining significant complexity savings.

Although the Detailed Description of Preferred Embodiments has been directed to certain exemplary embodiments, various modifications of these embodiments, as well as alternative embodiments, will be suggested to those skilled in the art. The invention encompasses any modifications or alternative embodiments that fall within the scope of the claims.

What is claimed:

1. A method of demodulating an information signal of a communication system in an electronic device, comprising the steps of:
    equalizing a code division multiple access (CDMA) received signal;
    despreading the CDMA received signal after said equalizing;
    making a decision for information symbols after said despreading; and
    using the decision for the information symbols and the CDMA received signal to perform parallel interference cancellation wherein said parallel interference cancellation includes interference cancellation, despreading and Rake receiving.

2. The method of claim 1, wherein said communication system is a multipath propagation environment where each received signal path experiences interference from other signals and other paths of the same signal.

3. The method of claim 1, wherein said despreading includes use of spreading codes.

4. The method of claim 1, wherein said despreading includes use of scrambling and spreading codes.

5. The method of claim 1 further comprising making at least one decision on a signal resulting from said parallel interference cancellation.

6. The method of Claim 5, further comprising performing another stage of interference cancellation on the signal resulting from said parallel interference cancellation after said decision.

7. The method of claim 6, further comprising making a final decision on the signal resulting from said parallel interference cancellation after said another stage of interference cancellation.

8. The method of claim 1 wherein said decision comprise clipping.

9. A method of despreading multiple codes in a communication receiver, comprising the steps of:
    equalizing a code division multiple access (CDMA) received signal;
    despreading the CDMA received signal after said equalizing;
    deciding the value of information symbols associated with said received signal after said despreading; and
    using the decided value of said information symbols and the CDMA received signal to perform parallel interference cancellation wherein said parallel interference cancellation includes interference cancellation, despreading and Rake receiving.

10. The method of claim 9 further comprising making at least one decision on a signal resulting from said parallel interference cancellation.

11. The method of Claim 10, further comprising performing another stage of interference cancellation on the signal resulting from said parallel interference cancellation after said decision.

12. The method of claim 11, further comprising making a final decision on the signal resulting from said parallel interference cancellation after said another stage of interference cancellation.

13. A receiver, comprising:
    an equalizer for equalizing a code division multiple access (CDMA) received signal;
    a despreader for despreading the equalized CDMA received signal; and
    a parallel interface canceller having an input for receiving said equalized CDMA received signal and another input for receiving said CDMA received signal wherein said parallel interference canceller implements interference cancellation, despreading and a Rake receiver.

14. The receiver of claim 13, wherein said despreader implements spreading codes.

15. The receiver of claim 13, wherein said despreader implements scrambling and spreading codes.

16. The receiver of claim 13, further comprising decision circuitry coupling said despreader to said parallel interference canceller circuit.

17. The receiver of claim 16, further comprising a second decision circuitry coupling said parallel interference canceller circuit to another interference canceller circuit.

18. The receiver of claim 17, further comprising at least one additional decision circuitry coupling said second decision circuitry to said another interference canceller circuit.

19. The receiver of claim 18, further comprising yet another decision circuitry coupled to an output of said another interference canceller circuit.

* * * * *